Patented Sept. 29, 1936

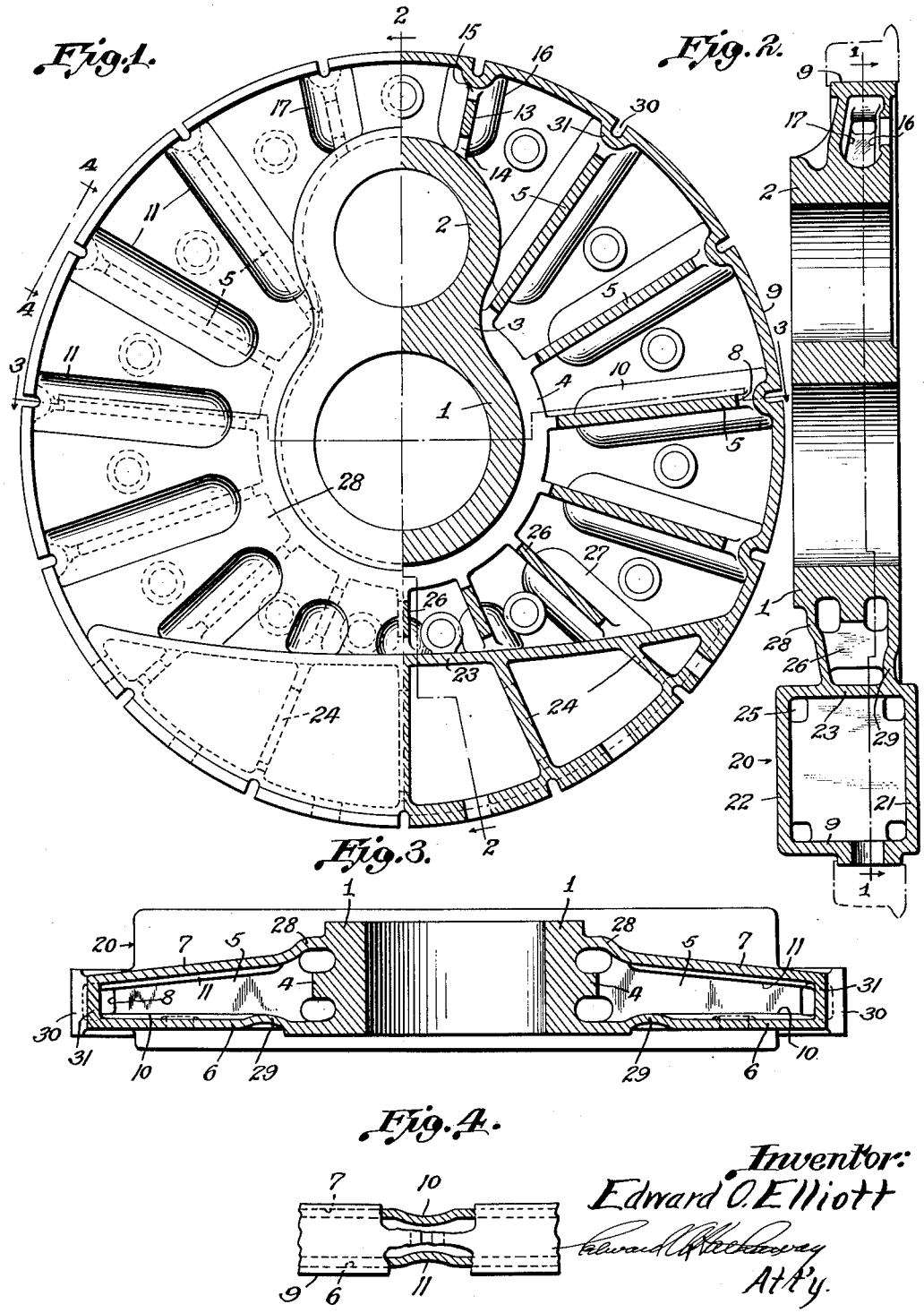

2,055,788

UNITED STATES PATENT OFFICE 2,055,788

LOCOMOTIVE DRIVING WHEEL

Edward O. Elliott, Jenkintown, Pa.

Application April 13, 1933, Serial No. 665,979

10 Claims. (Cl. 295—28)

This invention relates generally to locomotive driving wheels and more particularly to an improved wheel adapted to have a high degree of strength together with lightness and freedom from localized or shrinkage strains.

Locomotive driving wheels must of necessity be extremely rugged and absolutely safe to withstand the severe service conditions peculiar only to locomotives. To obtain the necessary strength for carrying the load and driving forces, together with desired safety, it has been customary to use an open spoke type of wheel although difficulty is sometimes had in properly balancing such a wheel on account of the distribution of weight therein.

To obtain proper weight distribution together with necessary strength, so-called double plate driving wheels have been suggested, and it is one object of my invention to provide an improved arrangement whereby a double plate locomotive driving wheel may be cast as a single integral unit in the same manner as ordinary spoke wheels and yet will have maximum strength together with relatively light weight. A further object of the invention is to accomplish the foregoing by providing an improved form of double plate driving wheel so that shrinkage strains may be adequately taken care of while at the same time causing such shrinkage means to add additional strength to the wheel, thereby allowing the improved shrinkage arrangement to perform inherently several functions including the elimination or reduction of shrinkage stresses and increasing the strength of the wheel.

A more specific object is to provide a double plate cast driving wheel having axle and crankpin hubs with relatively narrow ribs projecting radially therefrom and connected to the side plates through radially extending shrinkage groove sections. A further and more specific object in this respect is to provide improved shrinkage groove sections in the wheel rim and to have these shrinkage sections disposed preferably adjacent to or in alignment with the radially extending shrinkage grooves of the side plates. Still another object is to have shrinkage sections, one of ogee curvature and the other of annular groove formation, so arranged that either one or the other may be employed but in either case they are disposed adjacent the hub and so related to the other elements of the wheel as to cooperate therewith to impart strength thereto and to compensate for other strains.

Other objects and advantages will be more apparent to those skilled in the art from the following description of the accompanying drawing in which:

Fig. 1 is a side view of a locomotive driving wheel with the tire removed and showing one-half of the wheel in section;

Fig. 2 is a vertical section taken on the line 2—2 of Fig. 1;

Fig. 3 is a horizontal section taken on the line 3—3 of Fig. 1;

Fig. 4 is an elevational view looking in the direction of the line 4—4 of Fig. 1 showing one portion of the wheel rim adjacent its transverse and radial shrinkage sections, parts of which are broken away to show details of construction.

The specific embodiment of the invention, which is herein shown merely for purposes of illustrating the principle of the invention and of showing one form that it might take among possible others, comprises an axle hub 1 and crankpin hub 2 forming a single continuous member extending, as shown in Figs. 2 and 3, substantially for the full width of the wheel. It will be noted that the thickness of these hub sections is substantially uniform except for a relatively small fillet 3 at the juncture of the two hubs. Attention is called to this reduced or neck portion 3 because in the usual type of locomotive driving wheels, this portion must be filled out to a very material extent to insure adequate strength to resist the driving torque on the crankpin hole 2 although in my improved construction the reduced neck 3 is made possible while still maintaining maximum strength.

A radial or circumferential flange 4 is disposed centrally of hub 1 and extends from one side of the reduced neck around hub 1 to the other side of said neck. A series of radial ribs 5 lying flatwise in an axial direction extend outwardly preferably from the center of hub 1 to support inner and outer plates 6 and 7, it being noted that the ribs terminate preferably at 8 in spaced relation to a wheel rim 9 which is also connected to said side plates.

The specific manner of connecting the ribs 5 to the side plates to properly take care of the shrinkage strains and also increase the strength of the wheel, consists in providing a series of radial grooves or dished-in portions 10 and 11 in the plates 6 and 7 respectively, and to then have the ribs 5 joined to these depressed portions along the radial center line thereof. As shown in Fig. 4 the radial groove portions have preferably substantially the same thickness as that of the side plates.

As a result of my improved arrangement of radial grooves, the shrinkage strains in the side plates and radial ribs may be adequately compensated for during cooling of the wheel after casting thereof, and in addition these radial grooves serve as supplementary strengthening ribs for the side plates although if desired such grooves may be disposed intermediate of the ribs 5.

At points adjacent the crankpin hub 2 are disposed relatively short substantially radial ribs 13 extending outwardly from hub 2 toward wheel rim 9. These ribs have a portion of their inner ends spaced as at 14 from hub 2 and similarly their outer ends 15 are spaced from rim 9. Radial shrinkage grooves 16 and 17 are also provided similarly to grooves 10 and 11.

A counterbalance pocket, generally indicated at 20, has inner and outer sides 21 and 22 connected at their inner ends by a chordal member 23 and at their outer ends by wheel rim 9. A series of ribs 24 connect the two sides 21 and 22 and members 9 and 23, while openings 25 are formed in all four corners of these ribs. It will be noted that ribs 24 by being in alignment with wheel ribs 26 are in effect a continuation thereof, although ribs 26 and their radially extending expansion grooves 27 are successively shorter as the chordal member 23 approaches the center of the wheel 1. The ribs 26 and grooves 27 otherwise have the same construction and arrangement as ribs 5 and grooves 10.

To take care of the additional shrinkage strains that might occur adjacent the axle hub there is provided an ogee curve 28 and an annular groove section 29, each disposed concentric to the axle hub 1 but merging with the crankpin hub. To compensate for the circumferential shrinkage strains and also cooperate with the radially extending grooves 10, 16, and 27, I have provided a series of transverse grooves 30 having an arcuate portion 31 extending inwardly from the rim, this portion 31 as shown in Fig. 3 connecting the sides 6 and 7.

From the foregoing disclosure it is seen that I have provided a cast double plate locomotive driving wheel having a high degree of strength together with light weight and favorable weight distribution whereby more effective counterbalancing may be obtained. Also due to the particular arrangement of ribs, I am able to make the neck between the axle and crankpin hubs considerably reduced in weight over standard constructions. Furthermore, on account of the proper arrangement of specific means for taking care of the shrinkage strains the weight of the wheel may be used to maximum advantage.

It will of course be understood by those skilled in the art that various changes may be made in the details of construction and arrangement of parts without departing from the spirit of the invention as set forth in the appended claims.

I claim:

1. A cast locomotive driving wheel comprising axle and crankpin hubs connected by a neck portion, a rim, and inner and outer plates extending across said neck portion and radiating from each of said hubs; said hubs, rim and plates being cast as a single integral unit and both of said inner and outer plates having radially extending shrinkage grooves.

2. A cast locomotive driving wheel comprising axle and crankpin hubs connected by a neck portion, a rim, and inner and outer plates extending across said neck portion and radiating from each of said hubs; said hubs, rim and plates being cast as a single integral unit and said rim having a series of transverse shrinkage grooves provided with bottom walls depending directly from the rim.

3. A cast locomotive driving wheel comprising a hub, rim and inner and outer plates, all cast as a single integral unit; one of said plates having a series of radially extending shrinkage grooves and said rim having transverse shrinkage grooves adjacent to said radial grooves.

4. A cast locomotive driving wheel comprising axle and crankpin hubs connected by a neck portion, a rim, and inner and outer plates extending across said neck portion and radiating from each of said hubs; said hubs, rim and plates being cast as a single integral unit; and radial ribs connecting said side plates and spaced from said hub and rim.

5. A cast locomotive driving wheel comprising axle and crankpin hubs connected by a neck portion, a rim, and inner and outer plates extending across said neck portion and radiating from each of said hubs; said hubs, rim and plates being cast as a single integral unit; and an ogee curve formed in one of said plates adjacent at least to said axle hub and substantially concentric therewith.

6. A cast locomotive driving wheel comprising a hub, rim and inner and outer plates all cast as a single integral unit; means forming a counterbalance pocket including a chordal member, and ribs connecting said plates and extending radially between said hub and chordal member.

7. A cast locomotive driving wheel comprising a hub, rim and inner and outer plates all cast as a single integral unit; means forming a counterbalance pocket including a chordal member, ribs connecting said plates and extending radially between said hub and chordal member, and shrinkage grooves in one of said plates adjacent said ribs and of diminishing length as the chordal member approaches the wheel axis.

8. A cast locomotive driving wheel comprising a hub, rim, inner and outer plates all cast as a single integral unit, means forming a counterbalance pocket including a chordal member, ribs connecting said plates and extending radially between said hub and chordal member, and other ribs within said counterbalance pocket and disposed substantially in alignment with said ribs which are disposed between the chordal member and hub.

9. A cast locomotive driving wheel comprising a hub, rim, inner and outer plates all cast as a single integral unit, means forming a counterbalance pocket including a chordal member, ribs connecting said plates and extending radially between said hub and chordal member, other ribs within said counterbalance pocket and disposed substantially in alignment with said ribs which are disposed between the chordal member and hub, and transverse shrinkage grooves in said rim adjacent said ribs in the counterbalance pocket.

10. A cast locomotive driving wheel comprising axle and crankpin hubs connected by a neck portion, a rim, and inner and outer plates extending across said neck portion and radiating from each of said hubs; said hubs, rim and plates being cast as a single integral unit, opposed shrinkage groove portions formed in said side plates and extending substantially radially from each of said hubs, said inner and outer plates each having substantially flat portions between the radial shrinkage grooves, and ribs extending lengthwise of said grooves and connecting the portions thereof.

EDWARD O. ELLIOTT.